(12) United States Patent
Hollis

(10) Patent No.: US 6,345,592 B1
(45) Date of Patent: Feb. 12, 2002

(54) PET VACUUM

(76) Inventor: Brett Hollis, 1395 Morena Blvd., #59, San Diego, CA (US) 92110

(*) Notice: Subject to any disclaimer, the term of this patent is extended or adjusted under 35 U.S.C. 154(b) by 0 days.

(21) Appl. No.: 09/393,439

(22) Filed: Sep. 9, 1999

(51) Int. Cl.[7] .............................................. A01K 13/00
(52) U.S. Cl. ...................................................... 119/604
(58) Field of Search ................................ 119/604, 600, 119/601, 602, 603, 611, 650, 651; 15/339, 402, 353; 43/114, 136, 139, 132.1

(56) References Cited

U.S. PATENT DOCUMENTS

| | | | |
|---|---|---|---|
| 3,214,861 A | 11/1965 | Arther | 43/139 |
| 3,626,546 A | 12/1971 | Dove | 15/402 |
| 3,668,736 A | 6/1972 | Loscalzo | 15/402 |
| 4,279,095 A | 7/1981 | Aasen | 43/139 |
| 4,485,583 A | 12/1984 | Planty | 43/139 |
| 4,594,807 A * | 6/1986 | McQueen | 43/132.1 |
| 4,630,329 A | 12/1986 | Shores | 15/368 |
| 4,697,549 A * | 10/1987 | Hair | 119/156 |
| 4,729,147 A | 3/1988 | Armbruster | 15/314 |
| D309,049 S | 7/1990 | Sid et al. | D30/158 |
| 5,279,256 A * | 1/1994 | Brite | 119/85 |
| 5,647,091 A | 7/1997 | DeBlois et al. | 15/323 |
| 5,870,851 A * | 2/1999 | Shoemaker | 43/114 |

FOREIGN PATENT DOCUMENTS

WO     WO92/07461     5/1992

* cited by examiner

Primary Examiner—Charles T. Jordan
Assistant Examiner—Judith A. Nelson
(74) Attorney, Agent, or Firm—Gary L. Eastman

(57) ABSTRACT

The pet vacuum includes a canister, a vacuum pump, a flea remover, and a vacuum line connecting the flea remover to the vacuum pump. The vacuum pump is screwed onto the top of the canister which may be filled with a fluid pesticide, to trap and kill fleas as they are drawn into the pet vacuum through the flea remover. The flea remover includes a housing having a handle and a tip formed with an orifice. The vacuum line terminates at this orifice and when a flea is drawn into the flea remover, through this orifice, it travels the length of the vacuum line until it is deposited in the canister. The flea remover may also include a light source attached near the tip of the housing to illuminate the working area on the pet.

9 Claims, 5 Drawing Sheets

PET VACUUM

FIELD OF THE INVENTION

The present invention relates generally to pet grooming devices. More specifically, the present invention pertains to devices used to remove fleas from pets. The present invention is particularly, though not exclusively, useful as a means for drawing fleas from a dog or cat into a vacuum system, filtering these fleas from the airstream, and subsequently executing these fleas.

BACKGROUND OF THE INVENTION

Flea removal is a recurrent problem typically associated with the ownership of household pets. Pet owners often invest significant amounts of time and money in the continuous battle against these tiny, pesky creatures. Flea shampoos, treated collars, chemical dips, sprays, powders, combs, diet supplements, etc., are all used in what may be a futile attempt to ward off or eradicate the fleas infesting their pets.

Many of these methods for flea removal include harsh chemicals that may be dangerous not only to the pet, but to the pet owner as well. Pet owners may be unwilling to immerse their beloved pet in a vat of flea dip or douse them with a harmful powder or spray—if there is a chance of a toxic reaction to that chemical. Consequently, several devices have been patented which are designed to mechanically remove the fleas from the pet without the direct use of harsh chemicals.

For example, U.S. Pat. No. 4,630,329, which issued in 1986 to Shores for an invention entitled "Vacuum Assisted Flea Combing Device" (the "'329 patent"), discloses a vacuum device which may be used to remove fleas from long-haired and short-haired pets. The device of the '329 patent includes a flea comb attached to a vacuum canister via a typical vacuum hose.

Located along the hose is a flea trapping chamber with a porous filter treated with insecticide to trap and kill the fleas before they are drawn into the vacuum canister. It appears that the filter medium would likely allow fleas to pass through it and into the canister without being killed. It also appears that the device of the '329 patent would draw an abundance of pet hair into the system which may clog the flea comb or the filter to the point where the device of the '329 patent would be ineffective for flea removal. Furthermore, the device of the '329 patent does not include a light that would effectively illuminate the work area on the animal.

U.S. Pat. No. 4,729,147, which issued in 1988 to Armbruster for an invention entitled "Pet Groomer And Flea Annihilator" (the "'147 patent"), discloses another such vacuum device that may be used to remove and annihilate fleas from a dog or cat. The device of the '147 patent includes a vacuum motor, a flexible hose, a disposable vacuum cleaner type bag and interchangeable attachments for performing various grooming and flea removing procedures.

The device of the '147 patent further includes an electric grid which may be energized during operation of the device to kill any fleas which pass through the system. The device of the '147 patent appears to contain pitfalls similar to those of the device of the '329 patent discussed above. In other words, it appears that the electric grid would allow many of the fleas to pass through the system without being executed. Moreover, the vacuum cleaner type bag may then allow these living fleas to pass through the system without being trapped for disposal. Finally, the device of the '147 patent does not include a light source to illuminate the target area of the grooming attachments.

U.S. Pat. No. 4,485,583, which issued in 1984 to Planty for an invention entitled "Flea-Vacuum" (the "'583 patent"), discloses another vacuum device for removing fleas from a pet. The device of the '583 patent includes a hand held combing apparatus attached to a vacuum canister. The hand held combing apparatus further includes interchangeable and detachable combs and a disposable paper container for the entrapment and disposal of fleas.

The device of the '583 patent, like the other patents discussed above, also appears to be ineffective for the proper removal of fleas from a household pet. The paper filter is not treated with a pesticide to execute the fleas trapped within. Therefore, many of the fleas passing trapped within the paper filter would likely escape when the filter is thrown away. The device of the '583 patent also appears likely to be easily clogged by pet hair traveling through the system. Finally, the device of the '583 patent also does not include a light for illuminating the area of the pet needing flea removal.

In light of the problems associated with the above discussed flea removal devices, there is a need for a device which can be used to effectively trap all fleas entering the vacuum system. There is also a need for a flea removal device that can be used to effectively kill all fleas which are trapped within the filter medium. Moreover, there is a need for a flea removal device which minimizes clogging of the vacuum system by pet hair. Finally, there is a need for a flea removal device that includes a light properly attached to the workpiece to sufficiently illuminate the area on the pet needing treatment.

Accordingly, it is an object of the present invention to provide a pet vacuum which effectively traps all fleas that are drawn into the device by the vacuum pump. It is another object of the present invention to provide a pet vacuum which effectively executes all fleas trapped within the device. It is another object of the present invention to provide a pet vacuum that is unlikely to become clogged by pet hair.

It is another object of the present invention to provide a pet vacuum which includes a light attached to a flea remover that will effectively illuminate the target area of the device. It is another object of the present invention to provide a pet vacuum which is unobtrusive and unlikely to upset or scare an animal being groomed with the device. It is yet another object of the present invention to provide a pet vacuum which is easy to use, relatively easy to manufacture and relatively cost effective.

SUMMARY OF THE PRESENT INVENTION

The pet vacuum of the present invention includes a canister, a vacuum pump, a flea remover, and a vacuum line having a proximal end and a distal end leading from the vacuum pump to the flea remover. The top of the canister is formed with external threads that cooperate with internal threads formed in the bottom of the vacuum pump to allow the vacuum pump to be screwed onto the canister.

The canister is filled with a fluid, such as water treated with pesticide, to trap and kill fleas as they are drawn into the pet vacuum. The flea remover includes a housing having a pistol shape for easy grasping and use. The flea remover also includes a tip formed with an orifice. The distal end of the vacuum line terminates at the orifice formed in the tip of the flea remover. When a flea is drawn into the flea remover, it travels the length of the vacuum line until it is deposited in the canister.

The flea remover also includes a light source attached near the tip of the housing. The light source is designed so that it will illuminate the target area of the flea remover. The flea remover may also include a trigger actuated air valve that the vacuum line is routed through within the housing. The valve is normally closed to block the flow of air through the pet vacuum when not needed. However, when the user finds a flea on his or her pet, he or she may squeeze the trigger, located in the handle, to open the valve and draw the flea into the canister.

The pet vacuum provides a device which effectively traps all fleas that are drawn into the device by the vacuum pump. The pet vacuum also effectively euthanizes all fleas that are trapped within the device. Additionally, it is unlikely that the pet vacuum of the present invention will be easily clogged by pet hair. The pet vacuum also includes a light that effectively illuminates the target area of the device. Finally, the pet vacuum of the present invention provides a device which is unobtrusive and unlikely to upset or scare animals being groomed with the device.

DESCRIPTION OF THE DRAWINGS

The novel features of this invention, as well as the invention itself, both as to its structure and its operation, will be best understood from the accompanying drawings, taken in conjunction with the accompanying description, in which reference characters refer to similar parts, and in which.

DETAILED DESCRIPTION OF A PREFERRED EMBODIMENT

Figure 1:
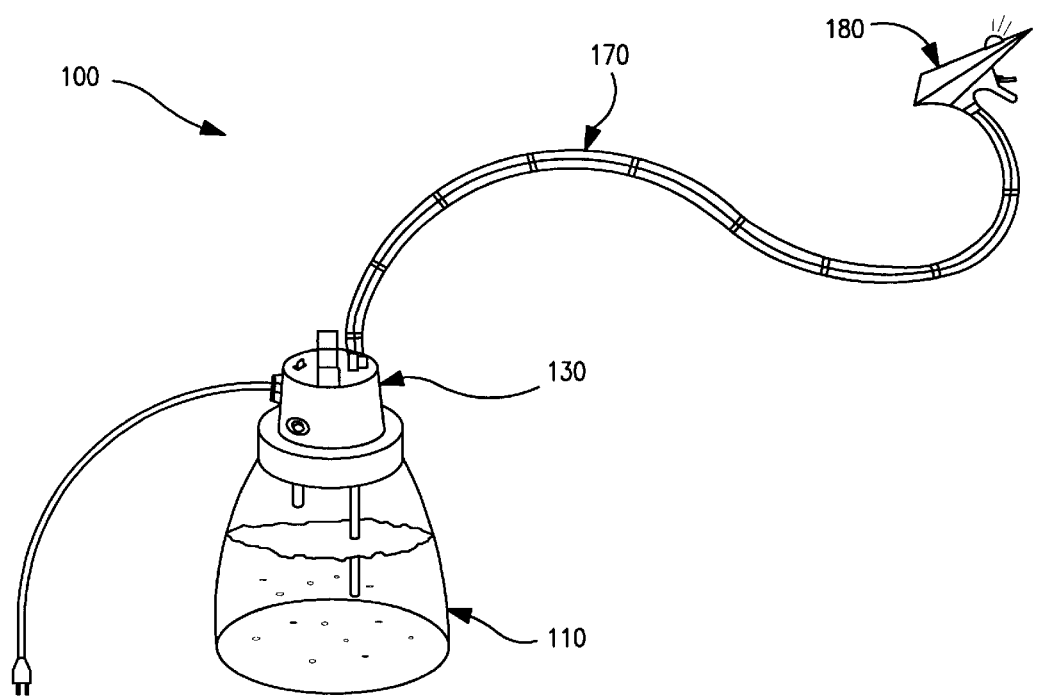
FIG. 1 is a perspective view of the Pet Vacuum of the present invention.

Referring initially to FIG. 1, a preferred embodiment of the pet vacuum is shown and generally designated 100. FIG. 1 shows that the pet vacuum 100 includes a canister 110, a vacuum pump 130, a vacuum line 170, and a flea remover 180.

Figure 2:
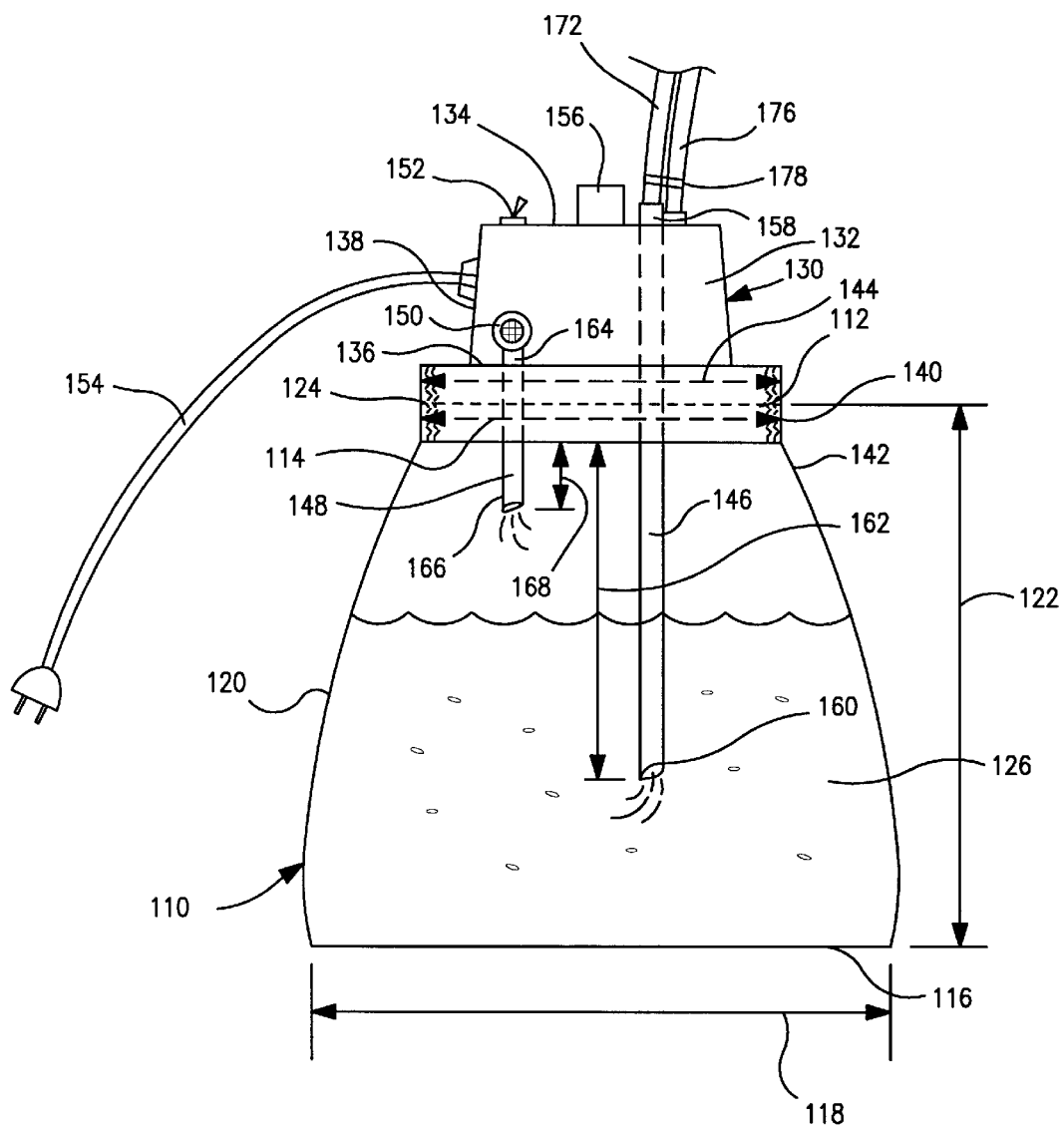
FIG. 2 is a plan view of the canister and the micro-vacuum pump.

Referring to FIG. 2, the canister 110 and the vacuum pump 130 are shown in greater detail. FIG. 2 shows that the canister 110 includes an open top 112 with a diameter 114, a closed bottom 116 with a diameter 118 and a continuous side wall 120 having a height 122. FIG. 2 further shows, in dashed lines, that the open top 112 is formed with external threads 124. In a preferred embodiment, the diameter 118 of the closed bottom 116 is sufficient to keep the canister 110 from tipping over during use.

In order to filter the fleas from the vacuum airstream, the canister 110 is filled with a fluid 126. In a preferred embodiment, the fluid 126 may be water treated with a pesticide to kill the fleas. Alternatively, the fluid 126 may be untreated so that it does not pose a threat to any animal or person if accidentally ingested. It can be appreciated that any other liquid with characteristics similar to water may be used.

FIG. 2 shows that the vacuum pump 130 includes a housing 132 having a top 134, a bottom 136, and a continuous side wall 138. Attached to the bottom 136 of the housing 132 is a hollow cylindrical rim 140 formed with internal threads 142 having an internal diameter 144. The internal diameter 144 of the hollow cylindrical rim 140 may be slightly larger than the external diameter 114 of the top 112 of the canister 110 so that the external threads 124 formed in the top 112 of the canister 110 will fit within the internal threads 142 formed in the cylindrical rim 140.

The external threads 124 formed in the top 112 of the canister 110 cooperate with the internal threads 142 formed in the cylindrical rim 140, so that the vacuum pump 130 may be installed on the canister 110. The canister 110 serves as a vacuum chamber and a seal (not shown) may be included between the vacuum pump 130 and the canister 110 so that unwanted air will not enter the canister 110 when the vacuum pump 130 is turned on.

The vacuum pump 130 further includes an inlet tube 146, an exhaust tube 148, an exhaust port 150, an internal vacuum chamber (not shown), an on/off switch 152, a first power cord 154 and a handle 156. The inlet tube 146 has a proximal end 158 which protrudes slightly beyond the top 134 of the housing 132 and distal end 160 which protrudes beyond the hollow cylindrical rim 140 a distance 162 so that the distal end 160 of the inlet tube 146 is always submerged in the fluid 126 within the canister 110.

The exhaust tube 148 has a proximal end 164 which terminates within the internal vacuum chamber (not shown) and a distal end 166 which protrudes beyond the hollow cylindrical rim 140 a distance 168 so that the distal end 166 of the exhaust tube 148 is never submerged in the fluid 126 within the canister 110. In a preferred embodiment, the exhaust port 150 may be formed in the continuous side wall 138 of the housing, but it can be appreciated that, in the alternative, it may be formed in the top 134 of the housing 132.

Referring back to FIG. 1, it is shown that the vacuum line 170 connects the flea remover 180 to the vacuum pump 130. The vacuum line 170 includes a proximal end 172 and a distal end 174. The proximal end 172 of the vacuum line 170 is connected directly to the proximal end 158 of the inlet tube 146 and the distal end 174 of the vacuum line 170 is connected to the flea remover 180. FIG. 1 further shows a second power cord 176 connected between the vacuum pump 130 and the flea remover 180. The second power cord 176 may be installed adjacent to the vacuum line 170 and may be bound to it with a plurality of clips 178.

Figure 3:
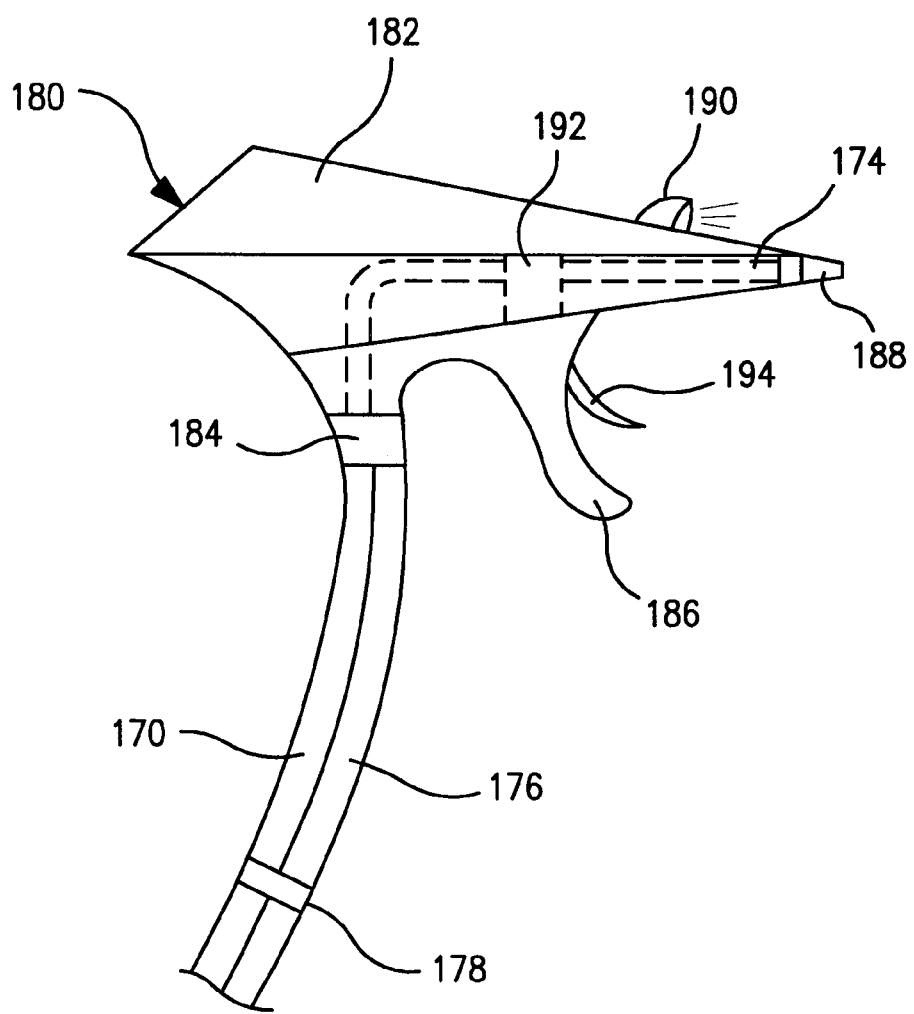
FIG. 3 is a plan view of the flea removal handle of the preferred embodiment of the Pet Vacuum of the pre sent invention.

Referring now to FIG. 3, the flea remover 180 is shown in detail. FIG. 3 shows that the flea remover 180 includes a housing 182 having a collar 184, a handle 186, a tip 188 formed with an orifice (not shown) and a light source 190. The vacuum line 170 and the power cord 176 enter the flea remover 180 through the collar 184 which supports the vacuum line 170 and the power cord 176 and helps to keep the vacuum line 170 from kinking at this entry point in the flea remover housing 182. The power cord 176 is connected to the light source 190 and the vacuum line 170 terminates at the orifice (not shown) formed in the tip 188 of the flea remover 180.

The handle 186 allows the flea remover 180 to be firmly grasped by the user when removing fleas from a pet. An air valve 192 may be installed within the flea remover housing 182 that the vacuum line 170 may pass through before terminating at the tip 188 of the flea remover 180. The air valve 192 may be opened by a trigger 194 installed in the handle 186 of the flea remover 180. The air valve may be normally closed to block the air flow through the vacuum line 170 until a flea is spotted by the user, at which point he or she could squeeze the trigger 194 to open the vacuum line 170 and draw the flea into the canister 110.

FIG. 3 shows that the light source 190 is attached to the flea remover housing 182 in a position adjacent to the tip 188 of the housing 182 such that the light from the light source 190 will illuminate the area of the pet targeted by the flea remover 180.

Figure 4:
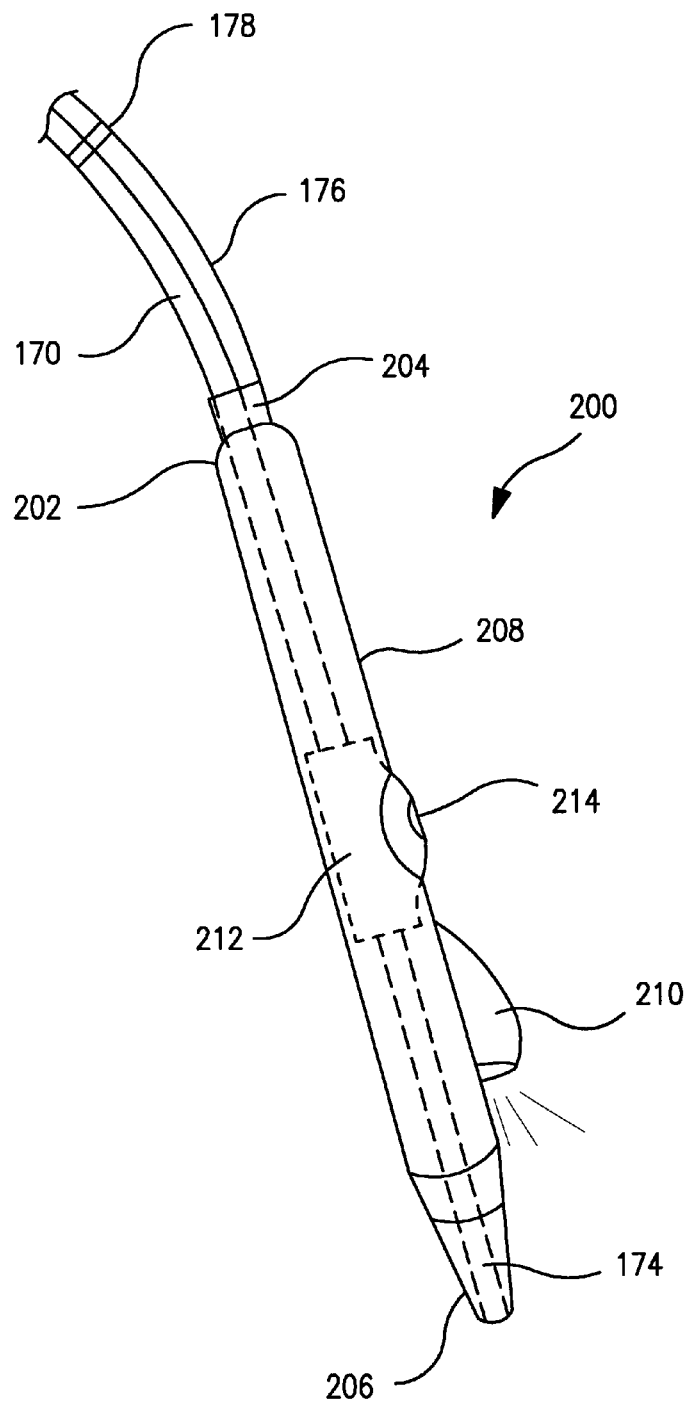
FIG. 4 is a plan view of the flea removal handle of an alternative embodiment of the Pet Vacuum of the present invention.

Referring now to FIG. 4, an alternative embodiment of the flea remover is shown and generally designated 200. The flea remover 200 shown in FIG. 4 includes a tubular housing 202 having a proximal end 204, a distal end 206, a continuous side wall 208 and a light source 210. The distal end 206 of the tubular housing 202 is formed with an orifice (not shown). The vacuum line 170 and the second power cord 176 enter the flea remover 200 through the proximal end 204 of the tubular housing 202. The second power cord 176 is connected to the light source 210 and the distal end 174 of the vacuum line 170 terminates at the orifice (not shown) formed in the distal end 206 of the tubular housing 202.

FIG. 4 shows that an air chamber 212 formed with a hole 214 may be installed along the vacuum line 170 within the tubular housing 202. The hole 214 formed in the air chamber 212 passes through the continuous side wall 208 of the tubular housing 202, and when that hole 214 it is uncovered, the vacuum pressure at the distal end 206 of the flea remover 200 is negligible.

However, when the user covers that hole 214 with a finger, the vacuum pressure at the distal end 206 of the flea remover 200 increases to the vacuum pressure in the canister 110 and fleas may be drawn into the canister 110 as the user spots them. FIG. 4 also shows that the light source 210 may be installed around the radius of the tubular housing 202 near its distal end 206, so that it will sufficiently illuminate the area being groomed with the pet vacuum 100.

Figure 5:
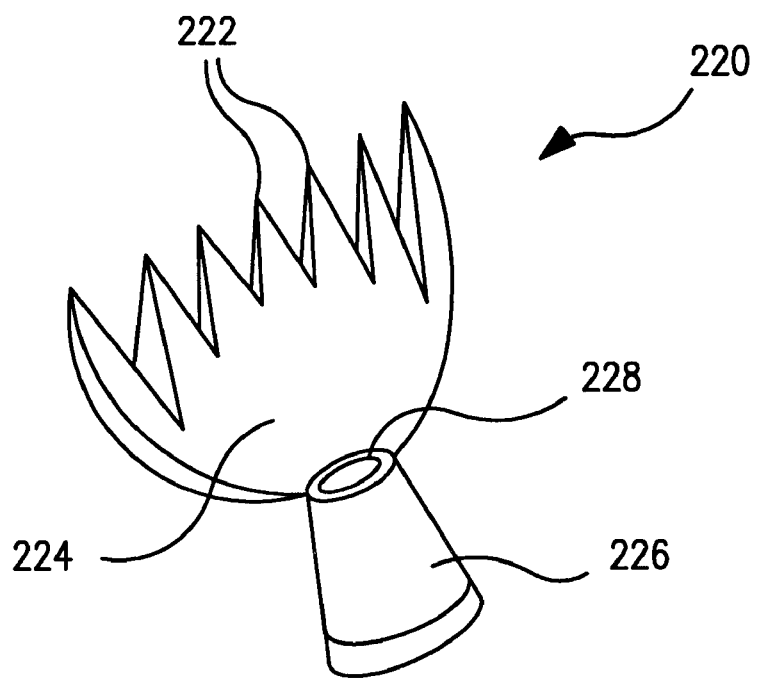
FIG. 5 is a perspective view of a comb attachment that may be attached to the flea removal handle shown in FIG. 3 or the flea removal handle shown in FIG. 4.

Referring finally to FIG. 5, a comb attachment is shown and generally designated 220. The comb attachment 220 includes a plurality of tines 222 attached to a scoop-shaped body 224. Also attached to the scoop-shaped body 224 is a conical collar 226 formed with an orifice 228. The conical collar 226 is sized to fit over the tip 188 of the flea remover 180 shown in FIG. 3, or the distal end 206 of the flea remover 200 shown in FIG. 4, and snap tightly in place. When snapped in place, the tip 188 of the flea remover 180 shown in FIG. 3, or the distal end 206 of the flea remover 200 shown in FIG. 4, will protrude through the orifice 228 in the conical collar 226.

In a preferred embodiment, the canister 110 may be made from clear plastic and the vacuum line 170 may be made from kink-resistant plastic hose. Either embodiment of the flea remover 180 or 200 may be manufactured from plastic. It may be appreciated that any of these components may be made from other materials having similar properties to those discussed above.

Also in a preferred embodiment, the vacuum pump 130 may be a twelve volt direct current (12 V DC) vacuum pump powered by a direct plug-in transformer that will convert one hundred and twenty volt alternating current (120 V AC) at sixty hertz (60 Hz) to twelve volt direct current (12 V DC). The light source 190 may be a twelve volt direct current (12 V DC) light drawing power from the same power source as the vacuum pump 130.

While the pet vacuum of the present invention as herein shown and disclosed in detail is fully capable of obtaining the objects and providing the advantages herein before stated, it is to be understood that it is merely illustrative of a preferred embodiment of the invention and that no limitations are intended to the details of construction or design herein shown other than as described in the appended claims.

I claim:

1. A pet vacuum comprising:

a canister partially filled with a fluid containing a pesticide;

a vacuum pump installed on said canister in a manner such that said canister serves as a vacuum chamber;

a flea remover having a tip formed with an orifice and a handle; and a vacuum line having a proximal end and a distal end, said proximal end connected to said vacuum pump and said distal end terminating at said orifice in said flea remover.

2. The pet vacuum of claim 1 further comprising a light source attached to said flea remover.

3. The pet vacuum of claim 2, further comprising an air valve incorporated into the flea remover in a manner such that said distal end of said vacuum line passes through said air valve before terminating at said orifice in said flea remover.

4. The pet vacuum of claim 3, wherein said air valve is actuated by a trigger installed in said handle of said flea remover.

5. The pet vacuum of claim 4, further comprising a comb attachment formed with an orifice, said comb attachment sized to snap in place over said tip of said flea remover so that said tip of said flea remover protrudes through said orifice in said comb attachment.

6. A pet vacuum comprising:

a canister partially filled with a fluid containing a pesticide;

a vacuum pump installed on said canister in a manner such that said canister serves as a vacuum chamber;

a flea remover having a tubular housing with a proximal end, a distal end formed with an orifice, and a continuous side wall; and a vacuum line having a proximal end and a distal end, said proximal end connected to said vacuum pump and said distal end terminating at said orifice in said distal end of said flea remover.

7. The pet vacuum of claim 6 further comprising a light source attached to said flea remover near said distal end of said tubular housing.

8. The pet vacuum of claim 7, wherein said tubular housing of said flea remover further comprises an air chamber between said proximal end of said tubular housing and said distal end of said tubular housing, said air chamber formed with a hole that passes through said continuous side wall of said tubular housing.

9. The pet vacuum of claim 8, further comprising a comb attachment formed with an orifice, said comb attachment sized to snap in place over said distal end of said tubular housing of said flea remover so that said tip of said tubular housing protrudes through said orifice in said comb attachment.

* * * * *